June 8, 1954

G. R. CARLSSON ET AL 2,680,714

WATER TREATING APPARATUS

Filed Sept. 5, 1951

GUST R. CARLSSON
and ERIC PICK
INVENTORS.

BY

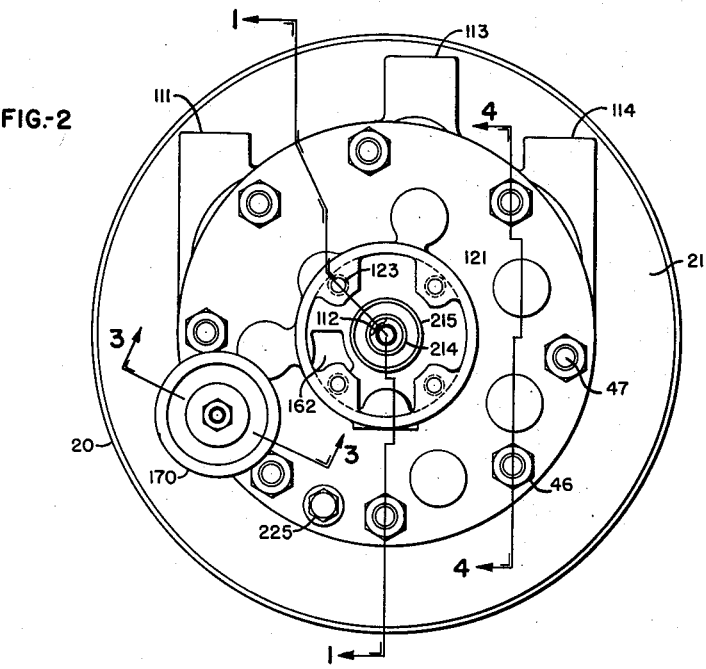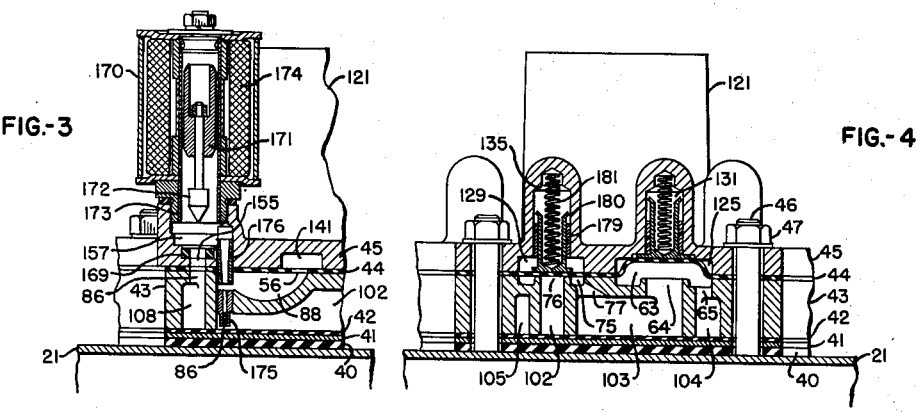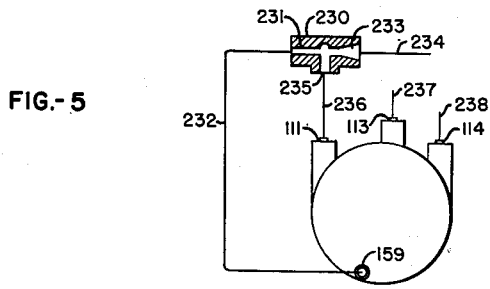

June 8, 1954  G. R. CARLSSON ET AL  2,680,714
WATER TREATING APPARATUS
Filed Sept. 5, 1951   4 Sheets-Sheet 3
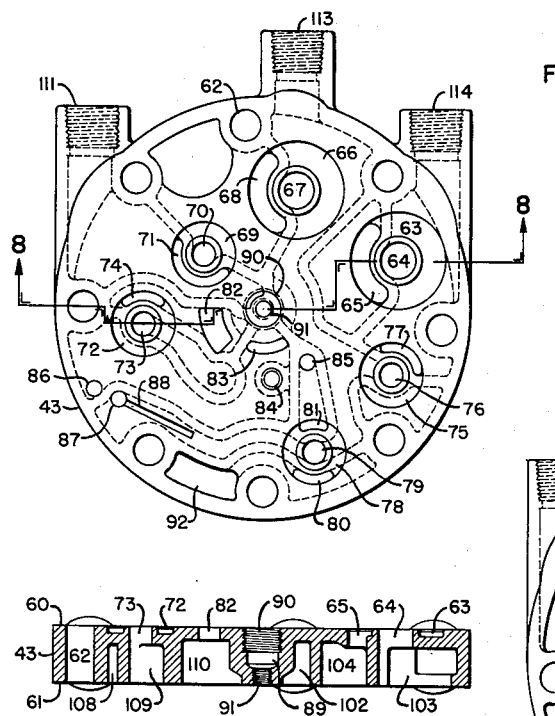
FIG.-7
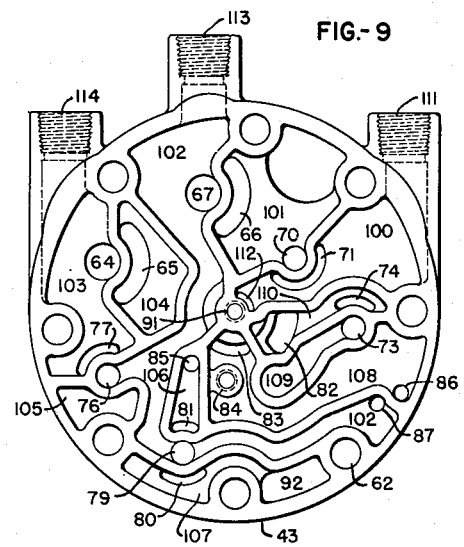
FIG.-9
FIG.-8
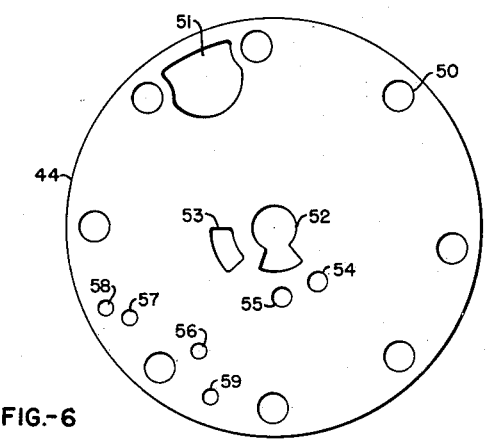
FIG.-6
GUST R. CARLSSON
and ERIC PICK
INVENTORS
BY

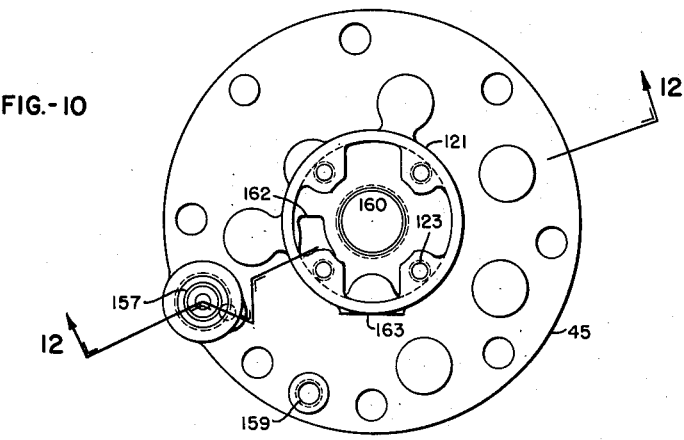
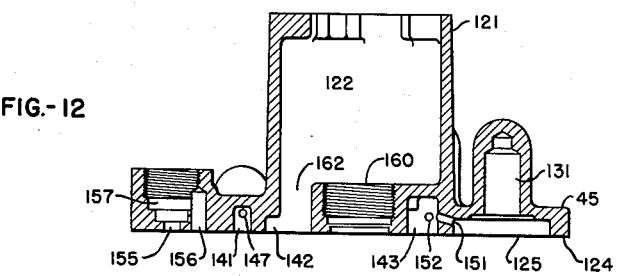
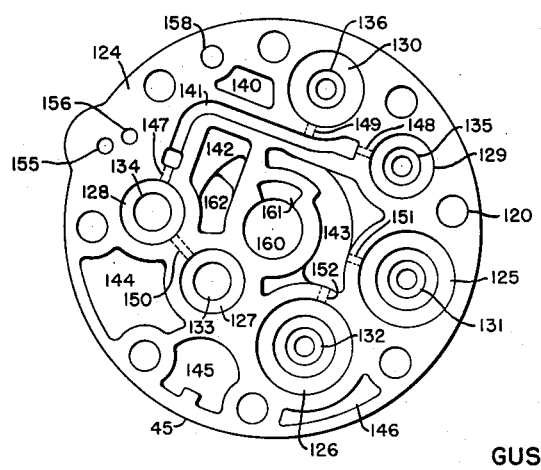

Patented June 8, 1954

2,680,714

UNITED STATES PATENT OFFICE 2,680,714

WATER TREATING APPARATUS

Gust R. Carlsson, Dumont, N. J., and Eric Pick, East Rockaway, N. Y., assignors to The Permutit Company, New York, N. Y., a corporation of Delaware Application September 5, 1951, Serial No. 245,134

6 Claims. (Cl. 210—24)

This invention relates to apparatus for treating water or other aqueous solutions of electrolytes by ion exchange and especially suited for softening water by cation exchange.

One of the objects of the present invention is to provide a novel apparatus which is so constructed as not to require the manual actuation of valves in its operation and use and which at the same time is compact, efficient, and inexpensive to manufacture.

Another object is to provide a mechanism for controlling the various flows and effecting regeneration of the ion exchange material which mechanism is mounted as a removable unit on top of the tank containing the ion exchange material and which mechanism supports a salt chamber.

A further object is to provide for such apparatus a valve mechanism comprising diaphragm valves to control the various flows and pilot valve means to control the operation of said diaphragm valves with multiple use of the water controlled by said valve mechanism.

The manner in which the above and further objects and novel features of this invention are achieved will appear more fully from the accompanying drawings and the following detailed description.

In the drawings in which similar reference numerals refer to similar parts throughout the several views:

Fig. 2 is a plan view of the apparatus of Fig. 1 with the salt chamber, trim band, and time switch removed;

Figure 1:
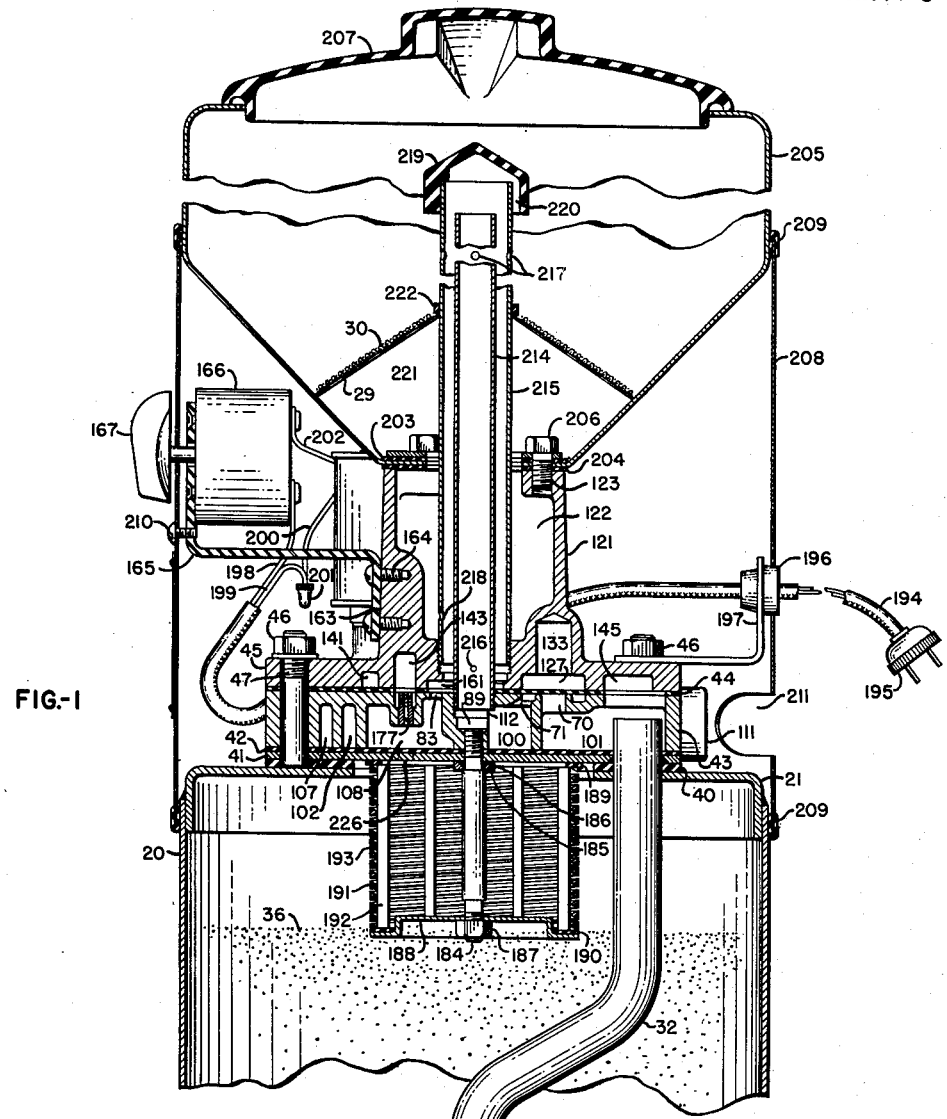
Fig. 1 is a fragmentary view, partly in cross-section, along line 1—1 of Fig. 2 of an apparatus according to our invention.

Figs. 3 and 4 are fragmentary views in cross-section along lines 3—3 and 4—4, respectively, of Fig. 2;

Fig. 5 is a diagrammatic view of the apparatus of Figs. 1 to 4 with a waste water ejector to dispose of the waste water;

Fig. 6 is a view of the diaphragm of the apparatus of Figs. 1 to 4;

Figs. 7 to 9 are views of the valve body of the apparatus of Figs. 1 to 4, Fig. 7 being a top view, Fig. 8 a cross-section along line 8—8 of Fig. 7, and Fig. 9 a bottom view; and Figs. 10, 11 and 12 are views of the valve cover of the apparatus of Figs. 1 to 4, Fig. 10 being a top view, Fig. 11 a bottom view, and Fig. 12 a view in cross-section along line 12—12 of Fig. 10.

Referring first to Fig. 1, an apparatus in accordance with our invention comprises a tank 20 having a top head 21 and a bottom head 22. On the bottom head 22 and within the tank 20 is mounted a distributor 23 having a hollow rubber member 24 with a cross passage 25 therein. Into the rubber member 24 is molded a bolt 26 which, by means of a nut 27, is fastened to the bottom head 22, thus securing the distributor 23 in place. The rubber member 24 has an external flange 28 which fits over and retains a strainer element consisting of a conically shaped perforated support 29 and a similarly shaped plastic cloth or wire mesh 30. Into the rubber member 24 is fitted an internal tube 31 which has its upper portion provided with an S-shaped bend as shown at 32. Near the bottom of tank 20 is provided a bushing 33 with a strainer 34 and a plug 35. The tank 20 contains water treating material 36 such as a cation exchange resin of the styrene-divinyl-benzene type in bead form.

On the top head 21 are placed a gasket 40, a spacer plate 41, a gasket 42, a valve body 43, a diaphragm 44 and a valve cover 45, all held in place by nuts 46 on studs 47 which are welded to the top head 21.

The diaphragm 44, as shown in Fig. 6, has holes 50 to accommodate the studs 47, a hole 51 which is above the upper end of tube 31 (see Fig. 1), a central opening 52, an elongated opening 53, and round holes 54, 55, 56, 57, 58 and 59.

The valve body 43 shown in Figs. 7, 8 and 9 has a flat top face 60 and a flat bottom face 61. Holes 62 serve to accommodate the studs 47. The top face 60 has formed therein cavities or valve chambers with associated ports as follows: chamber 63 with central port 64 and peripheral port 65, chamber 66 with central port 67 and peripheral port 68, chamber 69 with central port 70 and peripheral port 71, chamber 72 with central port 73 and peripheral port 74, chamber 75 with central port 76 and peripheral port 77, and chamber 78 with central port 79 and peripheral ports 80 and 81. In the top face 60 are, furthermore, arcuate openings 82 and 83, a stepped hole 84 and drilled holes 85, 86 and 87, the hole 87 communicating with a milled slot 88. In the center of the body 43 is a passage 89 with a large thread 90 opening into the top face 60 and a small thread 91 opening into the bottom face 61. The top face 60 has, furthermore, an arcuate opening 92.

In the bottom face 61 of valve body 43 are cavaties 100 to 110, inclusive. Cavity 100 communicates with a waste connection 111, with port 71, and with a port 112 leading to passage 89. Cavity 101 communicates with ports 66 and 70 and in the assembled unit, as shown in Fig. 1, with the internal tube 31. Cavity 102 communicates with a supply connection 113, with ports 67, 76 and 79, and with opening 87. Cavity 103 communicates with a service connection 114 and with ports 64 and 77. Cavity 104 communicates with port 65. Cavity 106 communicates with port 81 and opening 85. Cavity 107 communicates with port 80 and arcuate opening 92. Cavity 108 communicates with openings 83, 84 and 86. Cavity 109 communicates with port 73. Cavity 110 communicates with port 74 and opening 82.

The valve cover 45, as shown in detail in Figs. 10, 11 and 12, has holes 120 for the studs 47 and a tubular extension 121 enclosing a chamber 122 and provided at the top with screw holes 123. The flat bottom face 124 has therein cavities or pressure chambers 125, 126, 127, 128, 129 and 130 which, in the assembled unit, face valve chambers 63, 66, 69, 72, 75 and 78, respectively. Each of the chambers 125 to 130 has a concentric bore 131 to 136, respectively. In the face 124 are, furthermore, cavities 140, 141, 142, 143, 144, 145 and 146. Drilled holes 147, 148 and 149 interconnect cavity 141 with chambers 128, 129 and 130, respectively. Hole 150 interconnects chambers 127 and 128, and holes 151 and 152 connect cavity 143 with chambers 125 and 126, respectively.

In the face 124 are, furthermore, holes 155 and 156 leading into a solenoid valve chamber 157, a hole 158 leading to a tapped connection 159, and a tapped central bore 160 with lateral extension 161 communicating with chamber 122. A port 162 establishes communication between cavity 142 and chamber 122.

On the tubular extension 121 is a flat face 163 to which, by means of screws 164, is attached a bracket 165 carrying a conventional normally open time switch 166 with an operating knob 167 (see Fig. 1).

In the chamber 157 are mounted, as shown in Fig. 3, a soft rubber valve seat 169 and a solenoid valve mechanism 170 comprising an armature 171 and a needle 172, both located within a pressure tube 173 which is placed in the coil 174. An ejector inlet nozzle 175 is pressed into the hole 87 in valve body 43, and an ejector outlet nozzle 176 is pressed into the hole 155 in valve cover 45.

Into the hole 84 in valve body 43 is pressed an orifice bushing 177, as shown in Fig. 1.

As shown in Fig. 4, sleeves 179 are pressed into bores 131 and 135 and form bearings for poppets 180 urged against diaphragm 44 by springs 181. Similar sleeves, poppets and springs are also provided in bores 132 and 136, but they are not needed in bores 133 and 134.

Referring again to Fig. 1, a stud 184 is screwed into the threaded hole 91 in valve body 43 and makes a tight seal against the spacer plate 41 by means of a washer 185 and gasket 186. A nut 187 and cup-shaped disc 188 on stud 184 retain, between gaskets 189 and 190, a screen formed by a triangular bronze or stainless steel wire 191 helically wound over rods 192 and welded thereto, with slots 193 between adjacent coils of wire 191.

An extension cord 194 with plug 195 is held in a fitting 196 on bracket 197 and has one wire 198 connected to the time switch 166, and the other wire 199 to one lead 200 of coil 174 by means of a wire nut 201. The other lead 202 of coil 174 is connected to the time switch 166.

On the tubular extension 121 is mounted, between gaskets 203 and 204, a salt chamber 205 by means of screws 206 fitted into the holes 123.

The salt chamber 205 is advantageously seamless drawn of steel or other suitable metal, or molded of plastic. The open top of salt chamber 205 is closed by a removable cover 207 which is preferably molded of soft rubber or similar material which is not only corrosion proof but also not apt to break when dropped accidentally. A trim band 208 with extruded rubber or plastic channels 209 is fitted over the salt chamber 205 and the upper portion of tank 20. The trim band 208 is fastened to bracket 165 by means of a screw 210, and has a cut-out portion 211 to accommodate pipes screwed into connections 111, 113 and 114.

Two tubes 214 and 215, one within the other and mounted on the valve mechanism, extend upwardly through the chamber 122 and the open bottom of salt chamber 205. The tube 214 has a drain orifice 216 near its lower end; its upper end is located somewhat below the upper end of tube 215. Tube 215 has distributing orifices 217 near its upper end but at some distance below the top of tube 214. Near the lower end of tube 215 it is provided with a by-pass orifice 218. The upper end of tube 215 is closed by a cap 219 which prevents salt or other matter from entering, but which also serves to vent the tubes 214 and 215 by permitting free entry and exit of air through a passage 220. The tube 214 constitutes a waste tube and is screwed into the threaded hole 90 of valve body 43. The tube 215 constitutes a supply or head tube and is screwed into the threaded bore 160 of valve cover 45. Tube 214 is shown concentric within tube 215 which is a convenient but not necessary arrangement.

Within the salt chamber 205 is a screen 221 which for economy of construction can be made identical to the strainer element of distributor 23, comprising a conically shaped perforated support 29 and a similarly shaped plastic cloth or wire mesh 30. The screen is held in place by a ring 222 slipped over tube 215.

The tapped hole 159 is normally closed by a plug 225 which is removed under certain conditions, to be explained later.

In use, a supply pipe for water under pressure is screwed into connection 113, a pipe for the disposal of waste water is screwed into connection 111 and a pipe leading to a point of use is screwed into connection 114. The plug 195 is inserted into a live electrical outlet. This places the apparatus in condition to operate and deliver soft water through connection 114.

The time switch 166 being normally open, the solenoid 174 is de-energized which permits the armature 171 to drop so that the needle 172 drops into the valve seat 169. Thus the outlet 155 for the solenoid valve is closed.

Water entering into the connection 113 flows into cavity 102 and thence into the ejector inlet nozzle 175. With the solenoid valve closed as described before there is no flow through the solenoid valve. However, water under pressure fills the milled slot 88 and, through hole 56, cavity 141 and drilled holes 147, 148, 149 and 150, the pressure chambers 127, 128, 129 and 130. The pressure in these chambers forces the diaphragm against ports 70, 73, 76 and 79, closing them.

The pressure chambers 125 and 126 communicate through drilled holes 151 and 152, cavity 143 and hole 55 with the orifice bushing 177 and thence through cavity 103 and opening 83 with the inside of tube 215 which is vented at the top through passage 220. Thus there is atmospheric pressure in chambers 125 and 126. The diaphragm is, consequently, not pressed against ports 64 and 67 which are, therefore, opened.

Water under pressure entering through connection 113 into cavity 102 flows through port 67, valve chamber 66 and port 68, into cavity 101 and thence through tube 32 to strainer 23. Being uniformly distributed by the strainer 23 the water flows upwardly through the ion exchange material 36 and enters through the slots 193, thence passing through an opening (not shown) in spacer plate 41 into the cavity 104 from where it flows via port 65, valve chamber 63, port 64, and cavity 103 and connection 114 to the point of use.

When the capacity of the ion exchange material 36 has been exhausted the user does two things. First, lifting the cover 207, he introduces an appropriate quantity of coarse granular salt into chamber 205 where it comes to rest on the screen 221. Second, he turns the operating knob 167, thereby winding the time switch 166 and closing it. This establishes an electrical circuit from the source through wire 198, time switch 166, wire 202, coil 174, wires 200 and 199, back to the source. The energization of the coil 174 lifts the armature 171 and with it the needle 172 into the position shown in Fig. 3, thereby opening the valve seat 169.

Water under pressure from the supply pipe 113 now flows through cavity 102 and the ejector nozzles 175 and 176, thence into the valve chamber 157, through valve seat 169 and holes 155, 58 and 86 into cavity 108, thence through opening 83, extension 161 and bore 160, into the head tube 215.

The flow through the ejector nozzles 175 and 176 creates a suction in the milled slot 88 which through hole 56, cavity 141 and drilled holes 147, 148, 149 and 150 is transmitted to chambers 127, 128, 129 and 130. This suction pulls the diaphragm upward in these four chambers, overcoming the downward pressure of springs 181 acting on poppets 180 in chambers 129 and 130, and ports 70, 73, 76 and 79 are thus opened.

The opening of port 79 initiates a flow of water under pressure from connection 113 through cavity 102, port 79, chamber 78, port 81 into cavity 106, thence through holes 85 and 54 into cavity 143 and thence through hole 54 and orifice bushing 177 in hole 84 into cavity 106 where it mixes with and joins the stream of water flowing through the ejector nozzles 175 and 176 into the head tube 215, as described previously. The orifice bushing 177 causes a build-up of pressure on its upstream side including the cavity 143 whence such pressure is communicated through drilled holes 151 and 152 to the pressure chambers 125 and 126, respectively. Pressure in these chambers, aided by the force of the springs 181, pushes the diaphragm down so that ports 64 and 67 are closed and the initially-described flow of water through the valve mechanism, the tank and again the valve mechanism to service stops.

The opening of port 76 causes a flow of hard water from the connection 113 through cavity 102, port 76, chamber 75, port 77 and cavity 103 to the service connection 114. Thus, hard water is supplied to use during regeneration. This, in general, especially in household installations, is preferable to having no water available at all. However, if such flow of hard water to service during regeneration is not wanted, it can simply be prevented by plugging port 76.

The joint streams of water coming through the ejector nozzles 175 and 176 and the orifice bushing 177 rise in head tube 215 and radial streams of water are discharged through distributing orifices 217. The excess of water rises in tube 215 and overflows into the open top of tube 214 whence it passes through the center passage 89 to the cavity 100 and thence to waste through connection 111. While the flow of water into the head tube 215 may vary due to varying supply pressure, the discharge through distributing orifices 217 into the salt chamber 205 remains substantially constant due to the constant head of water over orifices 217, such head being equal to the vertical distance between the level of the orifices 217 and the top of tube 214. The water discharged by orifices 217 flows through the salt resting on strainer 221, dissolving it, and the resultant practically concentrated brine passes downwardly into chamber 122. As in most cases it is more effective to regenerate cation exchange material with somewhat dilute rather than concentrated brine, the dilution orifice 218 is provided to discharge a stream of water from the head tube 215 into chamber 122. The brine is thus diluted and then flows through the port 162, cavity 142, openings 53 and 82 into cavity 110, thence through port 74, chamber 72, port 73, cavity 109, an opening 226 in spacer plate 41 (shown in dotted lines in Fig. 1), thence through the slots 193 in a radially outward direction and passes downward through the ion exchange material 36, regenerating it. Thence the flow continues through distributor 23, internal tube 32, cavity 101, open port 70, chamber 69, port 71 and cavity 100 to the waste connection 111.

After all salt in chamber 205 has thus been dissolved the flow of fresh raw water continues along the same flow path, rinsing spent and excess brine from the ion exchange material 36.

After an interval of time which has been predetermined to allow for complete regeneration and rinsing of the ion exchange material, the time switch 166 runs down and stops with the electric circuit through coil 174 interrupted. The de-energization of the coil 174 drops the armature 171 and the needle 172, closing the valve seat 169. The water can no longer escape through the ejector outlet nozzle 176 and the pressure of the incoming water therefore builds up in slot 88 whence it is communicated to pressure chambers 127, 128, 129 and 130. This pressure, aided by the springs 181 in chambers 129 and 130, forces the diaphragm 44 down against ports 70, 73, 76 and 79 and all flow through the valve mechanism stops temporarily. As water under pressure no longer enters cavity 143 (port 79 being closed) the pressure in chambers 125 and 126 bleeds slowly away through holes 151 and 152, cavity 143 and orifice bushing 177 into tube 215. After a few seconds the pressure in chambers 125 and 126 has thus been lowered sufficiently for the supply pressure in ports 64 and 67 to push the diaphragm upwardly, overcoming the downward pressure of springs 181 and opening ports 64 and 67. This returns the apparatus to the normal service position and the initially described flow of water through the apparatus to service is reestablished.

Immediately after the termination of the regeneration any water remaining in the salt chamber 205 is drained off slowly through dilution orifice 218 thence through the lower part of tube 215 to the drain orifice 216 and from there via center passage 89, port 112 and cavity 100 to the waste connection 111.

It will be noted that the water is discharged through connection 111 by gravity. In certain cases the apparatus is installed in a basement or other location where no drain connection is available at a level low enough so that the water could flow there by gravity from connection 111. In such cases an ejector may be provided to lift the waste water above the top of the softener. Such an arrangement is diagrammatically shown in Fig. 5. An ejector 230 has an inlet nozzle 231 connected by an inlet tube 232 with the tapped connection 159 (the plug 225 being removed for this purpose). The ejector has furthermore an outlet nozzle 233 connected with an outlet tube or pipe 234 which leads to the desired elevated point of disposal for waste water. A suction connection 235 of the ejector 230 is connected with a suction pipe 236 screwed into the waste connection 111. A supply pipe 237 and a service pipe 238 are screwed into connections 113 and 114, respectively.

Flow of pressure water to the ejector 230 is automatically controlled by the valve mechanism of the apparatus without need for any additional valves. During normal service the port 79 is closed. Consequently no pressure water is admitted from the valve chamber 78 through port 80 into cavity 107 and thence through openings 92 and 59 to the tapped connection 159. During regeneration, however, when port 79 is opened, water under pressure coming from connection 113 follows the just-described flow path to connection 159, thence continuing through tube 232 to ejector inlet nozzle 231. Such flow creates a suction in pipe 236, and the discharge of the ejector 230 can then be passed to an elevated point of disposal for waste water. As soon as regeneration is terminated by opening of the time switch 166 flow through the ejector 230 stops instantaneously. With the use of an ejector 230 the salt chamber 205 is not drained after regeneration, some water remaining in it at all times.

This invention in certain of its aspects is an improvement on the co-pending application of Eric Pick, Serial No. 40,528 filed July 24, 1948, now Patent No. 2,596,915.

When the apparatus is shut down in a location subjected to freezing temperatures, as for instance in a home that is not occupied during the winter, all water should be drained from it to prevent damage. This is accomplished by disconnecting the apparatus from the supply of water under pressure and then removing plug 35 so that the water may drain from the tank 20, the strainer 34 preventing any escape or loss of ion exchange material 36.

While we have shown and described what we consider the preferred embodiments of our invention, modifications may be made without departing from its spirit and reference is therefore made to the appended claims for a definition of the scope of our invention.

What we claim is:
1. A water treating apparatus comprising a tank for ion exchange material and having a top head, a valve mechanism for controlling flow through said apparatus and having a valve body and a valve cover with openings therein, said valve body being attached to said top head, a regenerant chamber with an opening in its bottom, said regenerant chamber being mounted on said valve cover, passages in said valve body including a supply passage, a service passage, a waste passage and other passages, means for connecting said supply passage with a supply of water to be treated, means for connecting said service passage with a point of use for treated water, means for connecting said waste passage with a point of disposal for waste water, a waste tube mounted on said valve body in communication with said waste passage and extending upwardly through said openings in said valve cover and in the bottom of said regenerant chamber, and a supply tube mounted on said valve cover and communicating with one of said other passages, said supply tube extending upwardly through said opening in the bottom of said regenerant chamber.

2. The apparatus of claim 1, said waste tube being located within said supply tube.

3. The apparatus of claim 1, the upper end of said waste tube being located below the upper end of said supply tube.

4. In the apparatus of claim 1, orifice means in said supply tube, said orifice means being located adjacent to the upper end of said supply tube and below the upper end of said waste tube.

5. In the apparatus of claim 1, an orifice in said supply tube, said orifice being located near the lower end of said supply tube.

6. In the apparatus of claim 1, an orifice in said waste tube, said orifice being located near the lower end of said waste tube.

References Cited in the file of this patent
UNITED STATES PATENTS

| Number | Name | Date |
|---|---|---|
| 1,423,132 | Magrath | July 18, 1922 |
| 1,620,717 | Brice et al. | Mar. 15, 1927 |
| 1,685,816 | Kenney | Oct. 2, 1928 |
| 1,701,719 | Hughes | Feb. 12, 1929 |
| 1,725,110 | Stickney | Aug. 20, 1929 |
| 1,867,572 | Johnson | July 19, 1932 |
| 1,898,812 | Bressler et al. | Feb. 21, 1933 |
| 2,006,287 | Wilbanks | June 25, 1935 |
| 2,052,515 | Pick | Aug. 25, 1936 |
| 2,067,803 | Zimmerman et al. | Jan. 12, 1937 |
| 2,506,711 | Evans | May 9, 1950 |

FOREIGN PATENTS

| Number | Country | Date |
|---|---|---|
| 368,297 | Great Britain | Feb. 25, 1932 |